United States Patent
Yoshida et al.

(10) Patent No.: US 6,741,639 B1
(45) Date of Patent: May 25, 2004

(54) RADIO COMMUNICATING APPARATUS RADIO COMMUNICATING METHOD AND RECORDING MEDIUM

(75) Inventors: Hiroshi Yoshida, Kanagawa-ken (JP); Shinichi Kanno, Kanagawa-ken (JP); Takeshi Tomizawa, Kanagawa-ken (JP); Minoru Namekata, Kanagawa-ken (JP); Hiroshi Tsurumi, Kanagawa-ken (JP); Yuzo Tamada, Kanagawa-ken (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/466,929

(22) Filed: Dec. 20, 1999

(30) Foreign Application Priority Data

Dec. 21, 1998 (JP) .......................... 10-362059
Dec. 10, 1999 (JP) .......................... 11-351926

(51) Int. Cl.[7] .................................. H04L 15/16
(52) U.S. Cl. ...................... 375/219; 375/220
(58) Field of Search .................. 375/316–352, 375/219, 220, 221, 222, 295; 379/59; 455/418, 423; 713/200

(56) References Cited

U.S. PATENT DOCUMENTS

| | | | | |
|---|---|---|---|---|
| 5,249,218 A | * | 9/1993 | Sainton | 379/59 |
| 5,872,810 A | * | 2/1999 | Philips et al. | 375/222 |
| 5,911,121 A | * | 6/1999 | Andrews | 455/418 |
| 6,088,802 A | * | 7/2000 | Bialick et al. | 713/200 |
| 6,091,765 A | * | 7/2000 | Pietzold, III et al. | 375/219 |
| 6,259,911 B1 | * | 7/2001 | Bims et al. | 455/423 |

OTHER PUBLICATIONS

U.S. patent application Ser. No. 09/466,929, filed Dec. 20, 1999, Pending.
U.S. patent application Ser. No. 10/053,544, filed Jan. 24. 2002, Pending.
U.S. patent application Ser. No. 10/080,538, filed Feb. 25, 2002, Pending.
U.S. patent application Ser. No. 10/101,828, filed Mar. 21, 2002, Pending.
U.S. patent application Ser. No. 09/466,929, Yoshida et al., filed Dec. 20, 1999.
U.S. patent application Ser. No. 10/671,469, Wakutsu et al., filed Sep. 29, 2003.
U.S. patent application Ser. No. 10/653,130, Matsuo et al., filed Sep. 3, 2003.
J. Mitola, IEEE Communications Magazine, pps. 26–38, "The Software Radio Architecture," May 1995.

* cited by examiner

*Primary Examiner*—Stephen Chin
*Assistant Examiner*—Sam K. Ahn
(74) *Attorney, Agent, or Firm*—Oblon, Spivak, McClelland, Maier & Neustadt, P.C.

(57) ABSTRACT

A library is referred to and thus facilities are executed when executing an application program for receiving and transmitting radio signals. That is, the library serving as programs depending on hardware converts commands based on the application program into signal to control the hardware. As a result, the application program is describable by a program independent of an analog device for receiving and transmitting the radio signal, and a common application program can be used even in case of different hardware.

5 Claims, 8 Drawing Sheets

FIG.5
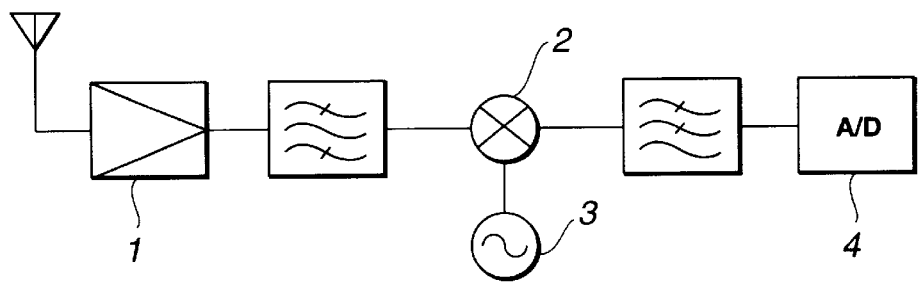
FIG.6
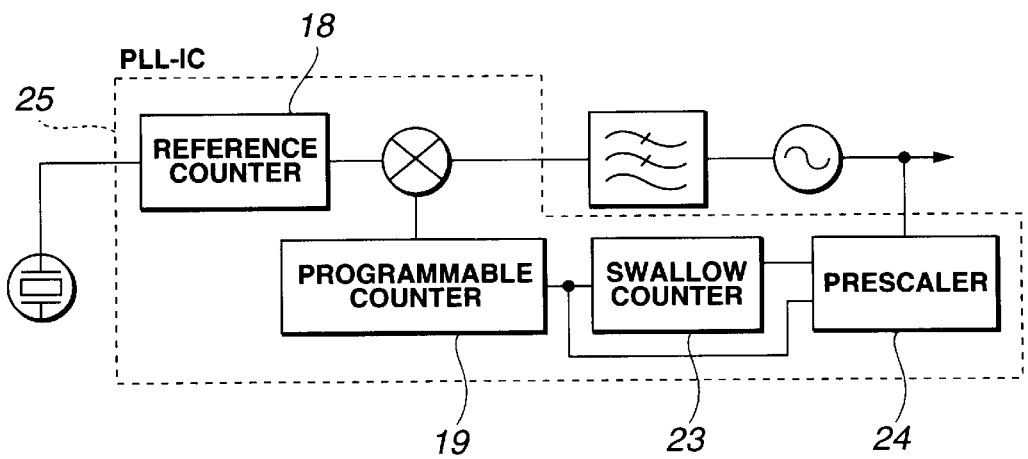
FIG.7(A) DATA 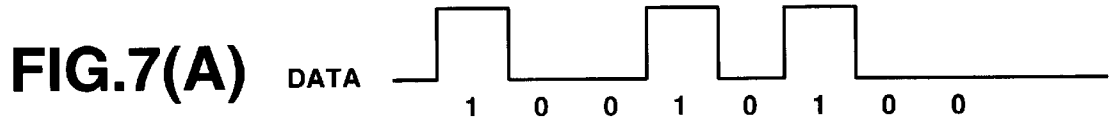
FIG.7(B) CLOCK 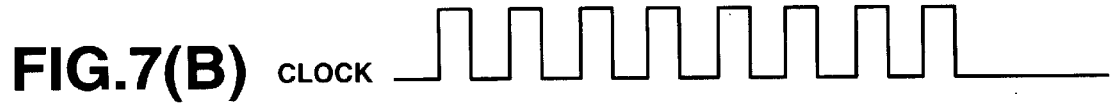
FIG.7(C) STROBE 

RADIO COMMUNICATING APPARATUS RADIO COMMUNICATING METHOD AND RECORDING MEDIUM

BACKGROUND OF THE INVENTION

1. Field of the Invention

The following serial numbers of pending applications, Ser. No. 10/653,130, 10/671,469, 10/053,544, 10/080,538 and 10/101,828, may be related to the disclosure herein, which are assigned to the common applicants.

The present invention relates to a radio communicating apparatus, more particularly, to a radio communicating apparatus for implementing a radio facility as software by use of a dedicated language by which the radio facility is described, a radio communicating method, and a recording medium.

2. Description of the Related Art

There is excessively increasing demand for mobile communication system such as a cellular phone at present, and the market for terminal presents an active appearance. Incidentally, there are currently a variety of kinds of communication systems in the market.

For example, as for the cellular phone, a PDC system in Japan, an AMPS system and a CDMA system in U.S.A., and a GSM system in Europe, in other words, different systems exist mixedly. Further, a PHS system is also used in one nation, namely, Japan in addition to the cellular phone.

Although working to make the mobile communication system standard tends to be advanced by an international standard system IMT-2000, there is very little possibility that a completely similar system is adopted among Japan, U.S.A., and Europe.

The above-mentioned situation makes the demand for implement the mobile communication terminal by a multi-mode that is usable to a plurality of systems, more increasing. However, the implementation of the mobile communication terminal by the multi-mode is remarkably difficult. Two kinds of terminals are built in one casing physically, and this simple configuration might implement the communication terminal by a dual mode as far as possible.

A related art of a radio communicating apparatus will be now described with reference to a drawing hereinbelow.

FIG. 1 shows a construction of the prior art of the radio communicating apparatus. Referring to FIG. 1, reference numeral 701 denotes an amplifier for amplifying an RF (high frequency) signal; 702 a mixer for converting a frequency; 703 a synthesizer for supplying a signal to the mixer 702; 704 an A/D converter for converting an analog signal into a digital signal; 705 a D/A converter for converting a digital signal into an analog signal; 706 a dedicated IC (ASIC); 707 a digital signal processing processor (DSP); 708 a dedicated ID (ASIC); 709 a central processing unit (CPU); 710 an I/O interface; 711 (a group of) hardware configured of the amplifier 701 to the I/O interface 710; 712 an OS; 713 an application program to operate on the OS 712; 714 an application program to operate on the DSP 707; and 715 (a group of) software configured of the OS 712 to the application program 714.

In accordance with the related art shown in FIG. 1, a radio is configured of the hardware 711 comprising: the amplifier 701; the mixer 702; the synthesizer 703; an analog circuit such as the A/D converter 704 and D/A converter 705; the dedicated ICs (ASICS) 706 and 708; digital circuits such as the DSP 707 and the CPU 709; and the I/O interface 710, etc., and the software 715 comprising: the OS 712 operating on the CPU 709; the application program 713 operating on the OS 712; and the application program 714 for DSP, etc.

Next, the operation of a radio terminal as the related art will be described with reference to FIG. 1. In case of reception, an RF section (701, 702, and 703 in the figure) converts a high-frequency signal which is inputted from an antenna (not shown) into a base band signal with a low-frequency. A desired signal is converted into a digital signal by the A/D converter 704, and then demodulates a transmitted signal by utilizing the DSP 707 and the CPU 709.

In case of transmission, the CPU 709 and DSP 707 modulate an original signal to be transmitted. The D/A converter 705 converts the signal into an analog signal. The RF section converts the analog signal into a high-frequency signal, thereby transmitting the high-frequency signal through the antenna.

Programs which are executed by the DSP 707 and CPU 709 is stored in a memory or the like in the radio terminal as the software 712, 713, and 714.

The control operation for the analog portion is performed, for example, by the application program 713 through the ASIC 708. Although, the control operation for the analog portion is executed from the ASIC 708 in FIG. 1, the control operation is directly controlled from the CPU 709 and the DSP 707 in practice.

Incidentally, the related art of the radio terminal has the following problems. In other words, in accordance with the related art of the radio terminal, the application programs 713 and 714 correspond to the programs dedicated for the DSP 707 or CPU 709, and thus are not used for general-purpose. Therefore, those programs are dedicated for some specific hardware architecture. It is impossible to use these programs for a radio having another hardware architecture which is different from the foregoing one without modification.

The RF section configured of the analog circuits are controlled by the dedicated LSIs such as the ASICS and gate arrays. Accordingly, it is impossible to use these programs for another different hardware.

As discussed above, the radio terminal shown as related art has problems such that the application program has no general-purpose, and the usage is restricted to a specific objective which depends on hardware.

SUMMARY OF THE INVENTION

It is an object of the present invention to provide a radio communicating apparatus capable of using an application program independent of a hardware architecture, a radio communicating method of the same, and a recording medium which records a program thereof.

According to the present invention, there is provided a radio communicating apparatus comprising: a receiving and transmitting device for receiving and transmitting radio signals; an A/D converting device for converting the received radio signal into a digital signal and outputting the digital signal; a D/A converting device for converting the digital signal to be transmitted into the radio signal and outputting the radio signal; a digital signal processing device for performing a digital signal process for an output of the A/D converting device and a digital signal process for an input of the D/A converting device; a control device for controlling at least one of the receiving and transmitting device, the A/D converting device, the D/A converting device, and the digital signal processing device by referring to a library comprising a group of software for implementing predetermined radio facilities and executing predetermined software on basic software.

According to the present invention, there is provided a radio communicating method comprising the steps of: a first process for receiving and transmitting radio signals; a second process for converting the received radio signal into a digital signal and outputting the digital signal; a third process for converting the digital signal to be transmitted into the radio signal and outputting the radio signal; a forth process for performing a digital signal process for an output of the second process and a digital signal process for an input of the third process; a fifth process for controlling at least one of the first process, the second process, the third process, and the forth process by referring to a library comprising a group of software for implementing predetermined radio facilities and executing predetermined software on basic software.

According to the present invention, there is provided a recording medium storing a computer-readable program, wherein the program comprises the steps of: a first process for executing predetermined software by referring to a library comprising a group of software to implement predetermined radio facilities; and a second process for controlling any one of a facility for receiving and transmitting radio signals by the predetermined software executed by the first process, a facility for converting the received radio signal into a digital signal and outputting the digital signal, a facility for converting the digital signal to be transmitted into the radio signal and outputting the radio signal, and a facility for performing a digital signal process for the digital signal.

These object and advantages of the present invention will be become further apparent from the following detailed explanation.

BRIEF DESCRIPTION OF THE DRAWINGS

FIG. 5 is a diagram showing a configuration of an analog portion;

FIG. 6 is a diagram showing a configuration of a synthesizer;

FIG. 7A to FIG. 7C are diagrams showing synthesizer setting data;

DESCRIPTION OF THE PREFERRED EMBODIMENTS

Embodiments of the present invention will be now described hereinbelow with reference to drawings.

Figure 2:
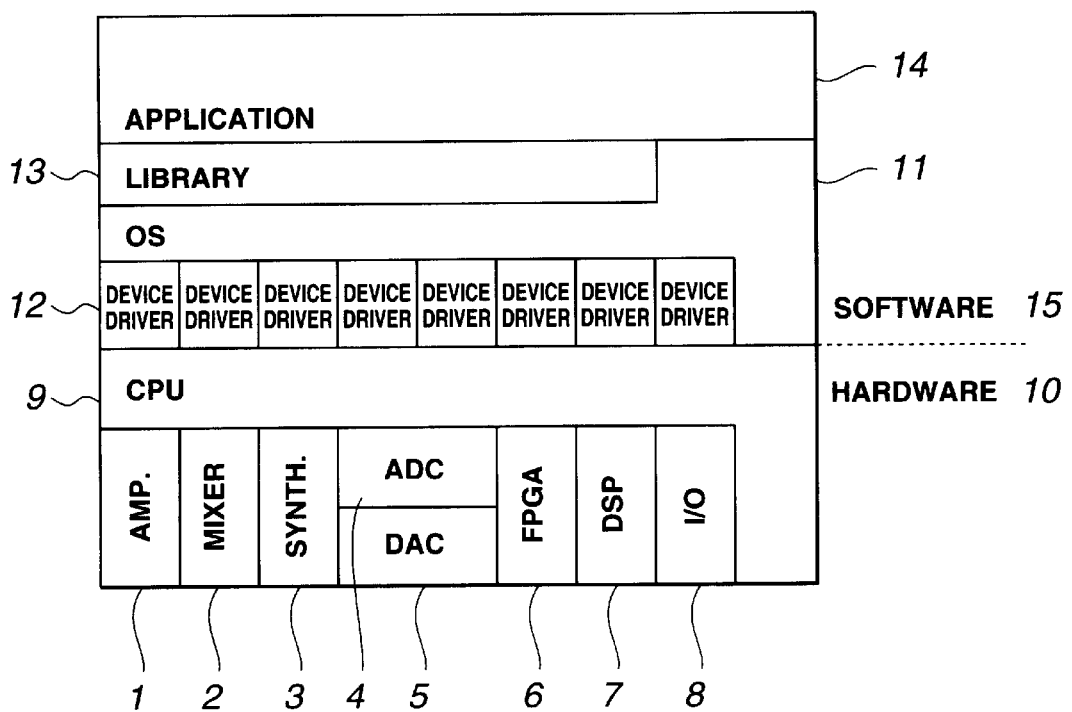
FIG. 2 is a diagram illustrating a first embodiment of the present invention.

FIG. 2 is an illustrative view illustrating a radio terminal according to a first embodiment of the present invention.

Referring to FIG. 2, reference numeral 1 denotes an amplifier to amplify an RF signal; 2 a mixer to converting a frequency; 3 a synthesizer to supply a signal to the mixer 2; 4 an A/D converter to convert an analog signal into a digital signal; 5 a D/A converter to convert a digital signal to an analog signal; 6 a programmable logic (FPGA); 7 a digital signal processing processor (DSP); 8 an I/O interface; 9 a central processing unit (CPU); and 10 hardware configured of the amplifier 1 to the CPU 9.

Reference numeral 11 denotes an OS; 12 device drivers to control the operation for the hardware from the OS; 13 a library in which a group of various functions are described; 14 an application; and 15 software configured of the OS 11 to the application 14.

Subsequently, an operation of the radio terminal will be described according to this embodiment.

Referring to FIG. 2, the OS 11 operates on the CPU 9, and controls the operation for the entire radio. The OS 11 is basic software depending on the CPU 9. The device drivers 12 mediate between the OS 11 and hardware except for the CPU 9, such as the amplifier 1, mixer 2, synthesizer 3, ADC 4, DAC 5, FPGA 6, DSP 7, and I/O interface 8. The device drivers 12 convert a command outputted from the OS 11 into a hardware-executable command, and transmits data via the CPU 9. If there is an output indicative of a state from each hardware, the output is sent to the device drivers 12 through the CPU 9 and then converted into a signal interpretable by the OS 11 as facilities of the device drivers 12.

Accordingly, the device drivers 12 concern the OS 11 and hardware 10 closely. Another device driver 12 is needed in dependence on different hardware 10. The variation of the OS 11 makes a device driver 12 corresponding thereto necessary.

The library 13 is a group of software for controlling the hardware 10 or implementing facilities themselves, and comprises a plurality of functions (command set). The library 13 is a group of functions dependent on a facility with high general-purpose in the commands outputted from the application 14 and the hardware configuration. Therefore, this means that the library 13 depends upon the hardware 10 and OS 11.

The aforementioned OS 11, device drivers 12, and library 13 are software depending on the hardware 10. Herein, these are called in a lump, basic software.

The application 14 is a program obtained by utilizing and describing a dedicated language which describes a radio facility (referred to as "radio description language" hereinbelow), and no description of the application 14 depends on the hardware 10. That is, when the hardware 10 is changed, the same program can be used for the application 14.

The control variation for the different hardware 10 can be absorbed by the device driver 12, OS 11, and library 13 and thus it is unnecessary to change the application 14. In other words, so long as the same interface is utilized between the application 14 and the OS 11 or library 13, the application 14 can operate on different hardware. The application 14 is obtained by using and describing the above-expressed radio description language.

Next, a method of executing software of the radio will be described according to this embodiment with reference to FIG. 3.

Figure 3:
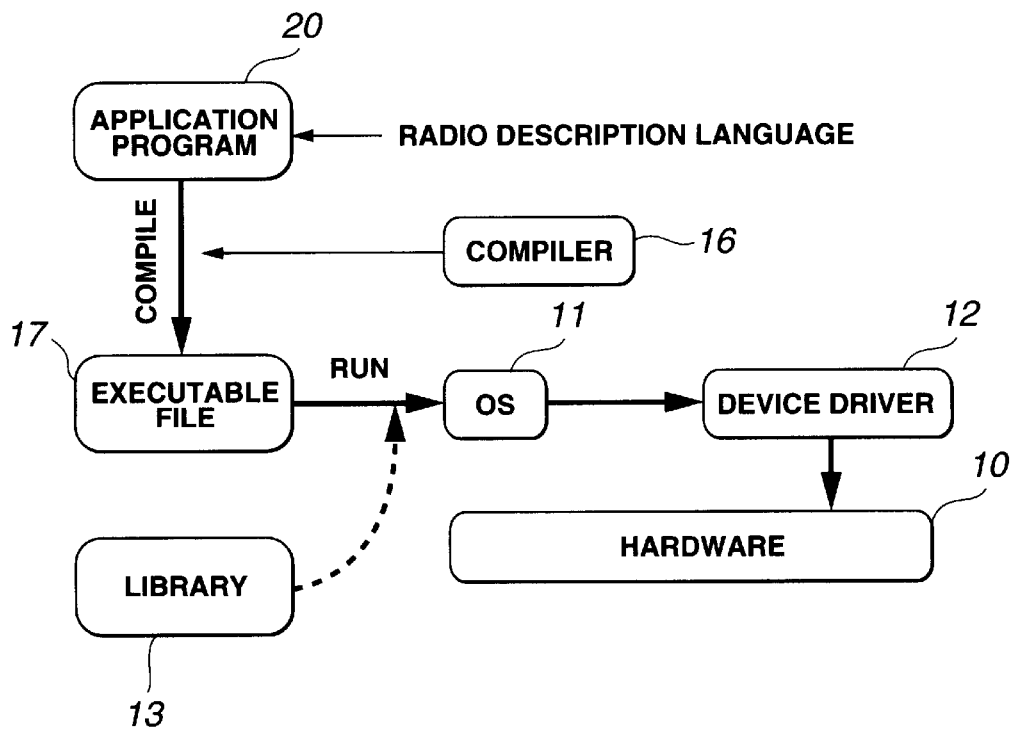
FIG. 3 is a diagram showing an operation of a compiler according to the present invention.

FIG. 3 is an illustrative view that illustrates an operation of software according to this invention. The component elements in FIG. 3 indicative of the same as those in FIG. 2 denote the same reference numerals and the description is performed. Referring to FIG. 3, reference numeral 10 denotes hardware of a radio, configured of the amplifiers 1 to the CPU 9, etc. in FIG. 2; 11 an OS to operate on the hardware 10; 20 an application program in which a radio facility is described, indicating a source file in an example of FIG. 3; 12 a device driver to convert a command, which is issued to the OS 11 by the application or the like, into a command for the hardware 10; 13 a library to which functions and the like are described; and 16 a compiler to convert the application program 20 into an executable file 17.

Note that the application 14 in FIG. 2 corresponds to the executable file 17 in FIG. 3. However, when the application program 20 is described by an interpreter language, etc., which is unnecessary for the compilation, the application program 20 is just the application 14 in FIG. 2.

The application program 20 described by the radio description language is compiled before execution. The compilation means the conversion into a machine language which the OS as a source program can interpret, and is performed by using the compiler 16.

The executable file 17 compiled by the compiler 16 is run on the OS 11. A necessary function is searched from the library 13 in accordance with a command which is described to the executable file 17 on running and used, thereby actually implementing the radio facility in a software manner.

The library 13 is provided with programs for generating control information to implement the radio facility on the hardware and programs themselves of the FPGA and the DSP, as functions in advance. A necessary program as well as a proper parameter is sent to the OS 11, based on the function and parameter which are supplied by the application.

The library 13 might be different dependently on a hardware configuration, for instance, although a facility is implemented in a hardware manner with one hardware configuration, the same facility is implemented by software with other hardware configuration.

As a consequence, the library 13 depends upon the hardware, and also is changed by the hardware 10 in accordance therewith.

Incidentally, according to the foregoing method, although the library to be prepared has an extremely large scale, it is unnecessary to hold the whole library on the radio side. There is a method whereby the radio side has only the part of the library which is used frequency and, contrarily, external data is employed for the other part of the library and the library is linked when compiling.

The above-mentioned library configuration makes it possible to suppress the library which the radio must have to the necessary and minimum level.

Figure 4:
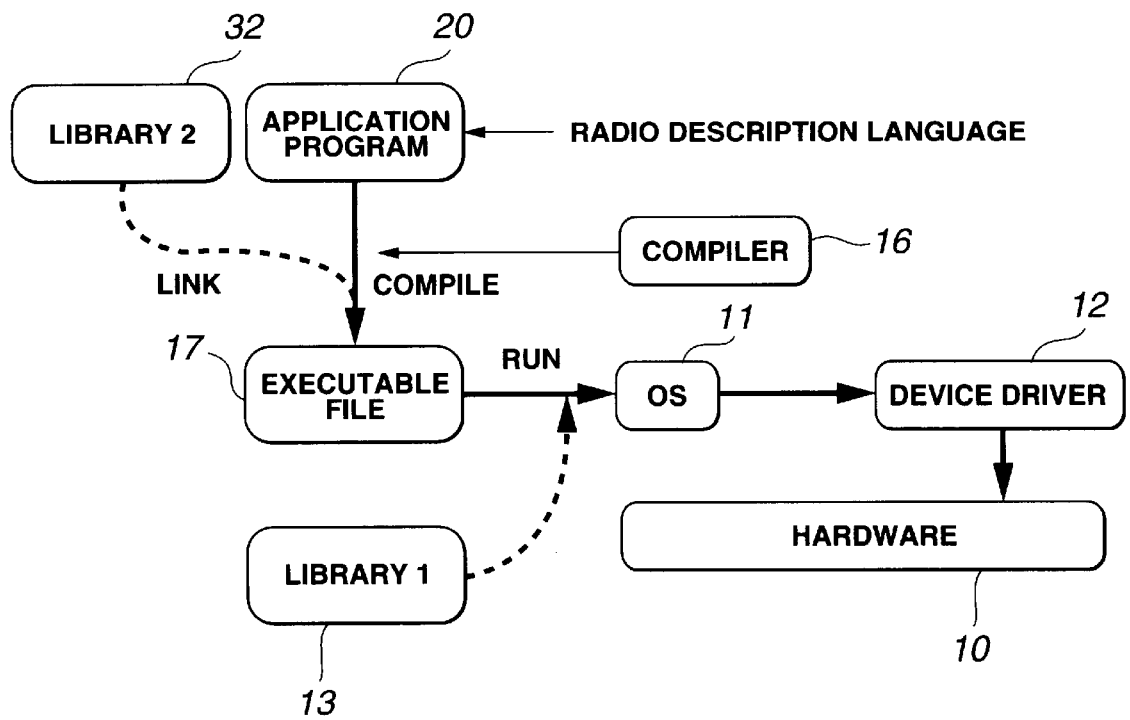
FIG. 4 is a diagram showing an operation of the compiler according to the present invention.

This flow is shown in FIG. 4. Referring to FIG. 4, the library is segmented into a first library 31 on the radio side and a second library 32 on the external side. The second library 32 is linked and the executable file is formed in case of compilation. The first library 13 is referred to upon executing the executable file, thereby realizing the operation as a radio.

A function, which is frequently referred to, is provided in the first library, and the remaining functions are provided in the second library. This results in remarkable reduction in the library scale that the radio side must have.

Incidentally, positions where the application 20 and compiler 16 are provided are not restricted in the examples shown in FIGS. 3 and 4. The executable file 17 corresponding to the application 14 in FIG. 2 is held in a memory in the radio. On the other hand, the application program 20 (source file) and compiler 16 may be held in the radio or in the external side of the radio.

It is general to store to a memory, the executable file 17 that is formed by the compiling process utilizing the compiler 16 for the application program 20, and then install the memory to the radio on manufacture thereof, as shown in the example of FIG. 3.

By contrast, the linking process and compiling process are constitutionally performed for the second library 32 after sales of the radio in view of the second library 32 as a facility expansion, as shown in the example of FIG. 4. Considering the memory capacity of the radio and the load of the CPU, etc., it is preferable to provide the application program 20 and compiler 16 to the external side of the radio together with the second library 32. It is exemplified that the application program 20 and the compiler 16 are provided to a base station or the like, the application program 20 is compiled in the base station or the like, the second library 32 is also linked, and the thus generated executable file 17 is downloaded to the radio.

It is noted that it will be obvious that the executable file 17 may be generated by holding the application program 20 and the compiler 16 in the memory in the radio and employing the second library which has been downloaded from the base station or the like.

Subsequently, the operation of the OS 11 will be now explained. The OS 11 performs the operation to distribute the commands supplied by the compiled executable file 17 and the library 13 into the device drivers 12 as hardware blocks.

If the command outputted from the executable file corresponds to the DSP, an operation program is transmitted to the device driver for the DSP 7. If the command corresponds to a command for the mixer 2, control information is transmitted to the device driver for the mixer 2.

The device drivers 12 have facilities to convert the command supplied by the executable file 17 (and the library 13) via the OS 11 into a command at the hardware level. This command makes a signal to be sent to each hardware through the CPU 9, and to thereby implement a desired facility, finally.

An example of a specific process will be now described according to this embodiment.

First of all, the operation of the radio will be mentioned according to this embodiment, in case of exemplifying the setting of a reception frequency. As expressed above, a function to set a reception frequency is provided to the application 14 (herein, where the name of function is referred to as "set-receive-frequency"), and the description is as follows.

```
#-----Application Source Program
$Freq_recv=1.9e9;
set_receiving_frequency($freq_recv);
-----
```

This instance shows a command for receiving a signal of 1900 MHz, and the variable $freq_recv is delivered to the OS 11 as an argument in the function set_receiving_frequency in case of execution.

It is necessary to set an oscillation frequency of the synthesizer so as to set the reception frequency in practice. The foregoing conversion (reception frequency→synthesizer oscillation frequency) might be varied, depending upon the hardware configuration. Therefore, this conversion is implemented by referring to the library 13 and using a function provided to the library 13 on executing the application.

For instance, in response to the setting of the reception frequency, there is searched a function (referred to as "receiving-freq-to-synthesizer", temporarily) to convert the set reception frequency into the synthesizer oscillation frequency, and the following result is obtained.

```
-----Library
$freq_synth=receiving_freq_to_synthesizer (1.9e9);
-----
```

It is to be noted that although the aforementioned examples are described by the alphabet, they are practically indicated by a machine language having the above-expressed meaning.

An operation example will be described by use of FIG. 5. FIG. 5 is a diagram illustrating the hardware configuration of the radio by a signal flow according to this embodiment. Referring to FIG. 5, reference numeral 1 denotes an amplifier; 2 a mixer; 3 a synthesizer; and 4 an A/D converter. A signal received though an antenna is amplified by the amplifier 1 and is thereafter multiplied by a signal supplied from the synthesizer 3 by the mixer 2, frequency converted into a low IF-frequency, thereby converting the IF frequency into a digital signal by the A/D converter.

If the IF frequency is equal to 380 MHz, an oscillation frequency of the synthesizer is equal to 1520 MHz serving as a difference between the reception frequency (1.9 GHz) and the IF frequency (380 MHz). The library 13 converts the reception frequency to the oscillation frequency of the synthesizer when executing the application program which has been compiled.

The foregoing conversion (reception frequency→synthesizer oscillation frequency) depends upon the hardware, so that the converting process is not described onto the application program directly, and a process corresponding to the converting process is performed in a part of the library in case of execution.

Further, when the compiled binary data practically makes the operation on the OS 11 by referring to the library 13, the process of the device driver 12 makes the setting of the synthesizer oscillation frequency, which has been decided by the library, being executed.

At this time, a command transmitted to the device driver 12 is generated by the library 13, yet. For instance, the following command is obtained.

```
#-----Output to device driver through OS
$freq_pdet=2.0e5; #phase comparison frequency is
200,000 HZ(=200 kHZ)
$freq_ref=1.0e7; #reference frequency is 10,000,000 HZ(=
10 MHZ)
$1=$freq_synth; #variable $1 is a value which is stored in
    $freq_synth
$2=$freq_pd; #variable $2 is a phase comparison frequency
    $3=$freq_ref; #variable S3 is a reference frequency
out_to_syn($1, $2, $3); variables $1, $2, and $3 are
    outputted to #synthesizer
-----
```

The compiled application refers to the library 13 upon execution, thereby performing the above-explained operations.

Next, the OS 11 which has received the command delivers the parameters $1, $2, and $3 to the device driver for driving the synthesizer 3 among the device drivers 12. A function out_to_syn means the command for the device driver for the synthesizer 3.

The OS 11 holds an address to output the parameters to the device driver for the synthesizer 3, and outputs the three parameters ($1, $2, and $3) to an I/O port of the synthesizer which has been predetermined.

As an example, values of an oscillation frequency, a phase comparison frequency(200 kHZ), a reference frequency (10 MHz) are inputted as $1, $2, and $3, respectively. The phase comparison frequency and reference frequency are automatically set in accordance with the configuration of the hardware 10. Thus, both of the frequencies are not supplied by the application 14, specifically, but automatically supplied by the library 13.

Successively, an example of a hardware configuration indicative of the detail of the synthesizer 3 is shown in FIG. 6. Referring to FIG. 6, reference numeral 18 denotes a reference counter; 19 a programmable counter; 23 a swallow counter; and 24 a prescaler. The reference counter 18 frequency-divides a reference signal of a crystal oscillator or the like, and supplies the frequency-divided signal to a phase comparator.

The programmable counter 19, swallow counter 23, and prescaler 24 are combined, so that they operate as a variable divider to perform the frequency-division relatively largely as a whole.

The operation of the divider is similar to a general divider and the description is therefore omitted. The reference counter 18, programmable counter 19, swallow counter 23, and prescaler 24 are built in a PLL-IC 25.

The device driver 12, which has been received the parameters from the OS 11, converts the values of the parameters $1, $2, and $3 into a signal for setting the PLL-IC 25 which the synthesizer 3 utilizes and transmits it.

In such a case, values are calculated as follows.

The ratio of the oscillation frequency to the phase comparison frequency is equal to (1900 MHz/200 kHz=9500) →the total frequency dividing ratio on the comparison frequency is equal to 9500.

The ratio of the reference frequency to the phase comparison frequency is equal to (10 MHz/200 kHz=50)→the frequency dividing ratio on the reference frequency is equal to 50.

In case of the configuration of the synthesizer 3 as shown in FIG. 6, the frequency dividing ratios of the dividers are calculated on the basis of those values as follows.

The count value of the programmable counter 22 is equal to 148.

The count value of the swallow counter 23 is equal to 28.

The count value of the reference counter 21 is equal to 50.

The signals indicative of the foregoing values are transmitted from the device driver 12 to the PLL-IC 25 of the synthesizer 3, and to thereby finally set the oscillation frequency of the synthesizer 3.

Those values are converted into binary digital signals in the device driver 12, and the following bit strings are generated (where all of the count values are assumed to 8 bits).

-----Synthesizer Data
-----Programmable Counter 10010100 Conversion #148 into binary data
-----Swallow Counter 00011100 Conversion #28 into binary data
-----Reference Counter 00110010 Conversion #50 into binary data
-----

The device driver 12 thereafter transmits the generated bit strings to the CPU 9. The CPU 9 transmits the supplied data to the hardware, namely, PLL-IC 25, as serial data, as exemplified in FIG. 7A to FIG. 7C, signals of data, clock, and strobe.

It is noted that a signal is directly outputted from the CPU 9 to the synthesizer 3 in this embodiment, as an example, but a dedicated device for I/O is provided and a signal may be outputted therefrom instead of the foregoing example.

FIG. 7A to FIG. 7C show cases of a data train that is transmitted from the CPU 9 to the synthesizer 3 and setting a frequency dividing ratio of 148 to the programmable counter in the example.

Signals are transmitted as three kinds of serial signals, and comprises "DATA" indicative of the contents of the data, "CLOCK" indicative of a data delimiter, "STROBE" indicative of the end of transmitting data.

The data is latched when the CLOCK signal is trailed. Data 10010100 is sequentially transmitted synchronously with the leading of the CLOCK signal, thereby sending a desired frequency dividing ratio to the programmable counter.

The STROBE signal is led after end of data transmission, this shows the end of data, the frequency dividing ratio of the programmable counter is set.

The operation is also performed to the swallow counter and reference counter similarly, so that a desired frequency dividing ratio is set to the synthesizer. This enables a desired oscillation frequency to be obtained finally and a signal of a desired frequency to be received.

A command "Receive a signal of 1900 MHz.", which has been first described to the application program, is finally converted into a command showing the transmission to the PLL-IC of the synthesizer as logic data through the above-discussed steps, thereby enabling the actual reception.

So long as only the command for controlling a physical layer is described to the application program, the library/OS/device driver/hardware properly operate, and thus the desired operation can be executed.

As a result of the aforementioned configuration of the radio, the programming can be executed without the recognition of hardware/software because of no need of discrimination about whether the operation object is hardware or software on the interface on the radio side in view of the application program. Any application program can be utilized for general-purpose by handling the interface with the application uniformly in view of the hardware side.

Although it is impossible to execute the operation for controlling the physical layer of the radio in a computer such as a personal computer by the application program without depending upon the hardware, the usage of the radio according to the present invention enables the operation for radio physical layer by the application program without depending upon the hardware.

Figure 8:
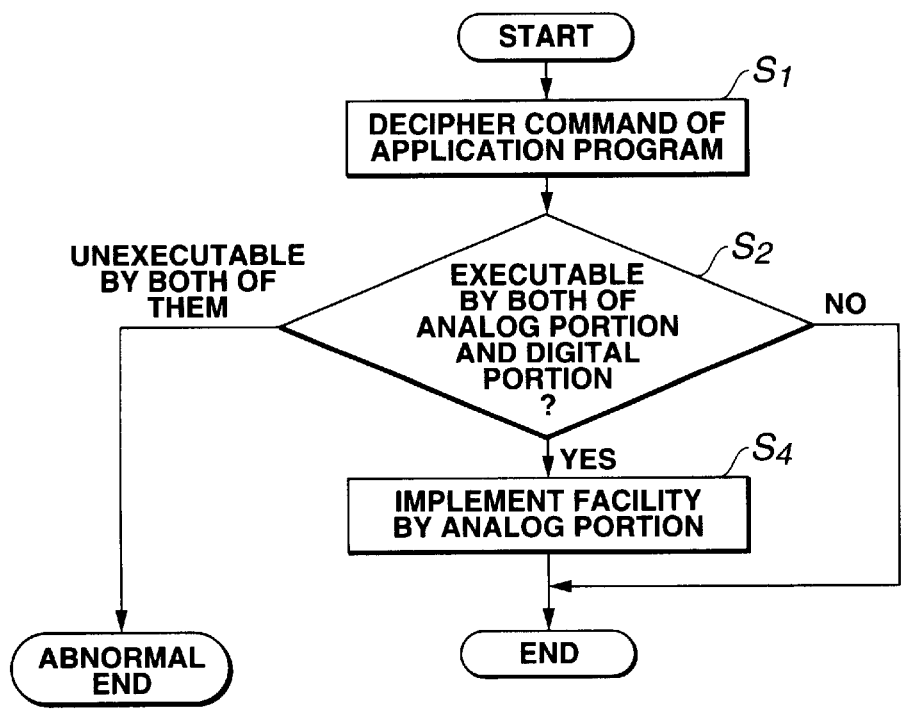
FIGS. 8 and 9 are flowcharts showing another embodiment of the present invention, respectively.
Figure 9:
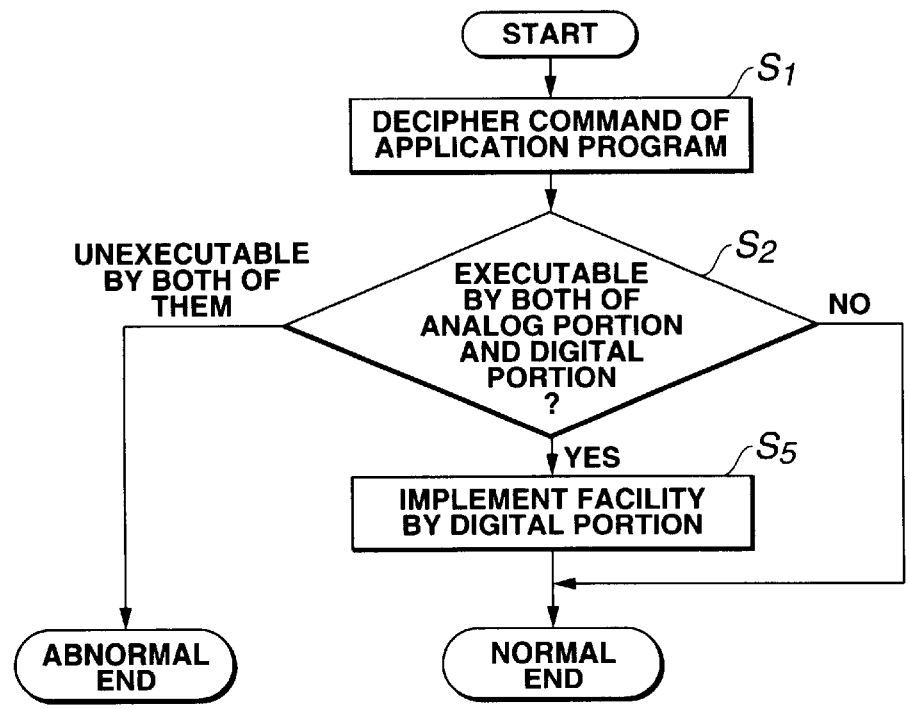

FIGS. 8 and 9 are flowcharts showing another embodiment according to the present invention.

Figure 1:
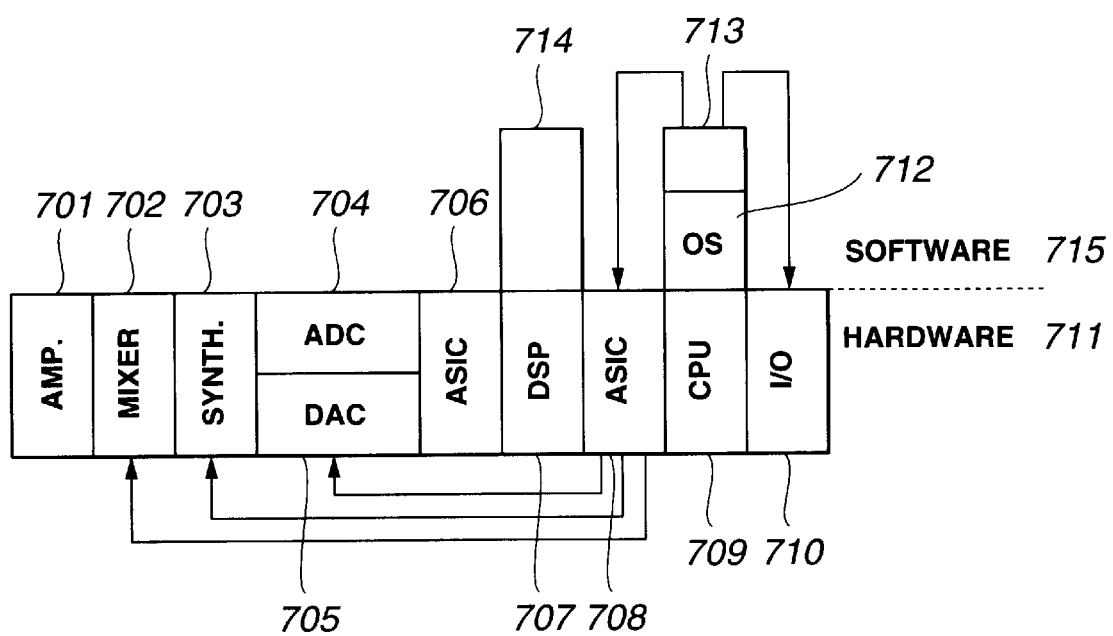
FIG. 1 is a diagram explaining a prior art of the present invention.

The hardware in the radio communication apparatus in the embodiment of FIG. 1 is constructed by the analog portion and the digital portion. It is possible to select the analog portion and digital portion and to thereby implement the radio facility, depending upon software operating on the hardware. Considering that it is exemplified that an active filter for base band is provided to the analog portion and also an FIR filter by an FPGA is provided to the digital portion, it is able to use the analog base band filter as a low-pass filter and thus remove a superfluous frequency component in an input reception signal. It is also able to use the analog filter as a through filter, add a proper tap coefficient to an FIR filter of the digital portion, and thus form a filter having a frequency characteristic which is fully the same or similar.

Although, obviously, a range (for example, a cut-off frequency and an order in case of a low-pass filter), in which the same facility can be implemented, is limited by the hardware, an overlapped characteristic exists. Since the application program according to the present invention is described irrespective of the hardware, it is important to allocate a circuit part for implementing a certain facility (hereinlater, referred to as a facility block), to which one of the analog portion and digital portion, in the case where it is possible to implement the facility when the facility block exists in both of the analog portion and digital portion. It is a feature of the present invention that the library 13 selects a facility block, namely, hardware for implementing a certain facility.

First, according to a first method, the whole is configured so that the library might implement the command of the application program by the analog block as much as possible. In other words, according to the first method, in the case where a facility A can be realized by both the analog portion and the digital portion as an example, the facility A is allocated to the analog portion preferentially.

FIG. 8 shows a procedure of this method in detail. First, a command regarding the radio facility described in the application program is deciphered when compiling the application program (step S1). Next, it is checked to see whether the facility can be implemented by either one of the digital portion and the analog portion or both thereof (step S2). In this instance, if only either one of the digital portion and the analog portion can implement the facility, the application program is compiled so as to execute the facility by a block whereby the facility is made executable. If both of the digital portion and analog portion can implement the facility, the application program is compiled so as to implement the facility, preferentially by the analog portion (step S4). If neither of the digital portion and the analog portion can implement the facility, the processing routine ends as abnormality.

As a result of the above-discussed compilation, if the digital portion implements the facility, a power consumption for the digital circuit is necessary. On the other hand, if the analog portion implements the facility, a power consumption can be set to 0 and low-consumption power can be realized in the radio communication apparatus, for example, in the case where the facility can be implemented by a passive circuit.

Subsequently, according to a second embodiment, on the contrary to the first method, the whole is configured so that the library might implement the command of the application program by the digital block as much as possible.

FIG. 9 shows a procedure of this method in detail. First, a command regarding the radio facility described in the application program is deciphered when compiling the application program (step S1). Next, it is checked to see whether the facility can be implemented by either one of the digital portion and the analog portion or both thereof (step S2). In this instance, if only either one of the digital portion and the analog portion can implement the facility, the application program is compiled so as to execute the facility by a block whereby the facility is made executable. If both of the digital portion and analog portion can implement the facility, the application program is compiled so as to implement the facility, preferentially by the digital portion (step S5). If neither of the digital portion and the analog portion can implement the facility, the processing routine ends as abnormality.

As a consequence of the above-discussed compilation, if the implementation by the analog portion results in obtaining an unpreferable characteristic, the implementation by the digital portion results in enabling an ideal characteristic to be realized and a preferable characteristic to be obtained over the whole radio communicating apparatus.

With respect to the selection of the implementing means, namely, the analog portion or digital portion, the implementing means is not uniformly set to all of the radio facilities, but it is discriminated whether the digital portion or the analog portion is selected every radio facility block, as exemplified that it is decided in advance that the digital portion is preferentially used for a filter and the analog portion is preferentially used for a frequency converter, thereby realizing the improvement of the characteristics as a whole. Further, no application program fully relates to the selection, so that it is possible to develop the application independently, and realize an ideal configuration since the compiler and library are automatically allocated to means for implementing the radio facilities depending on the hardware.

With regard to the foregoing selection of the analog portion or the digital portion for the facility, a rule thereof (whether the digital portion is allocated or the analog portion is allocated) is described to the library beforehand, and to thereby enable the automatic allocation by the contents of the application program. For example, if the consumption power of the digital filter is larger than that of the analog low-pass filter as mentioned above, the consumption power of the entire radio can be suppressed at the lower level by processing of the analog filter processing as much as possible, as compared with by that of the digital filter. In such a case, the radio is controlled so that the library allows, preferentially, the analog portion to process the facility.

The library holds a table of the radio facility which is executable by both the analog portion and the digital portion. By referring to a limitation performance of the radio facility and the rule which have been described to the table, it is discriminated whether a certain facility is allocated to the analog portion or the digital portion.

Although the above-stated embodiment determines the method of allocating the analog/digital portion every facility block, obviously, the allocation may be performed by a signal processing speed.

Figure 10:
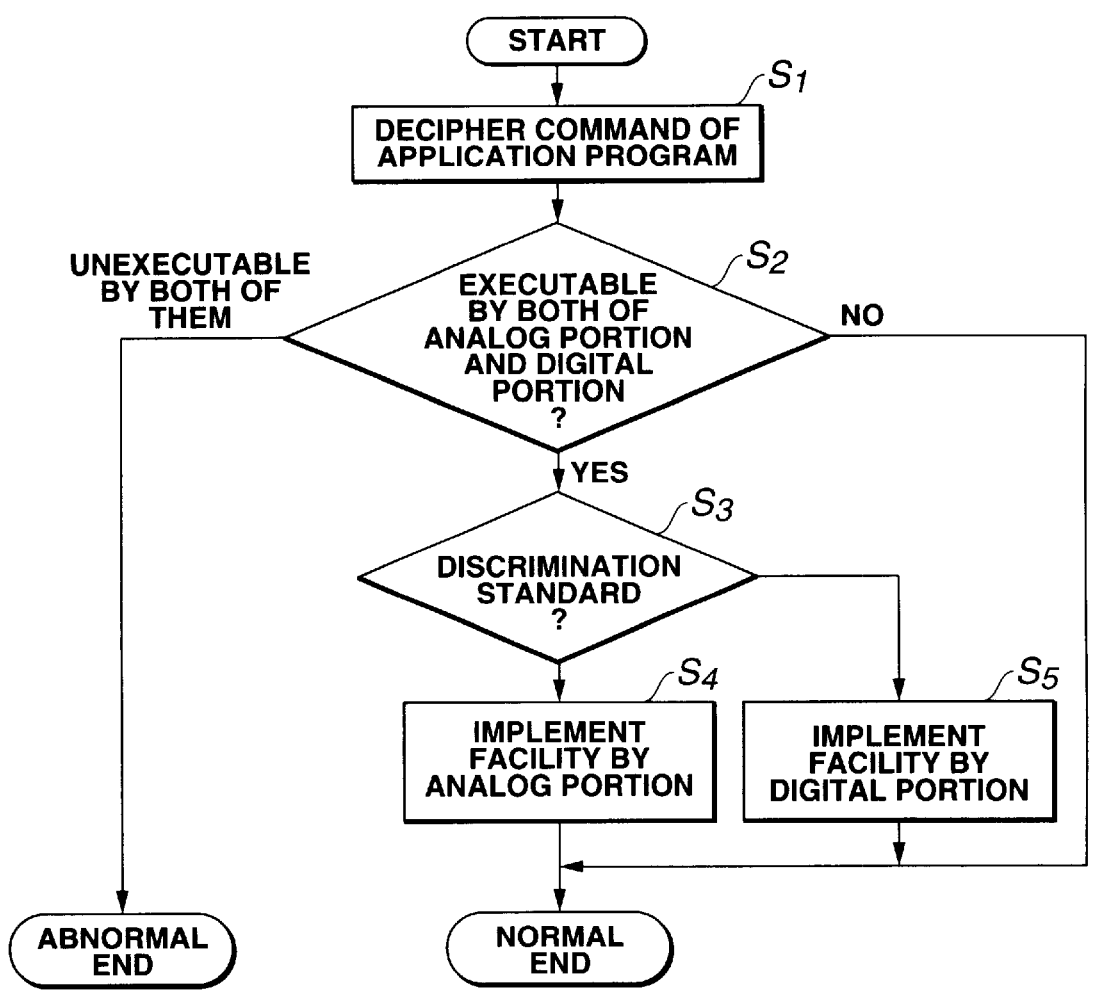
FIG. 10 is a flowchart showing another embodiment of the present invention.

In addition, the following embodiment can be exemplified as a variation of this embodiment. That is, there is a method whereby it is discriminated which one of the digital portion and the analog portion can implement the facility on the basis of a certain discriminating condition when it is capable of implementing the facility by both the analog portion and the digital portion. FIG. 10 is a flowchart showing this method.

First, a command regarding the radio facility described in the application program is deciphered when compiling the application program (step S1). Next, it is checked to see whether the facility can be implemented by either one of the digital portion and the analog portion or both thereof (step S2). In this instance, if only either one of the digital portion and the analog portion can implement the facility, the application program is compiled so as to execute the facility by a block whereby the facility is made executable. If both of the digital portion and analog portion can implement the facility, the processing routine successively advances step S3. In step S3, it is discriminated whether the facility is implemented by the digital portion or the analog portion, based on a predetermined discriminating standard. In step S4 or S5, the facility is realized by one of the analog portion and the digital portion.

The following is listed as the above-mentioned discriminating standard.

(1) Select one of the analog portion and the digital portion that has smaller consumption current.
(2) Select one of the analog portion and the digital portion that has more preferable characteristics.
(3) Select one of the analog portion and the digital portion in which delay time is shorter.
(4) Select one of the analog portion and the digital portion that has a smaller quantity of reciprocation of signals between the digital portion and the analog portion.

According to (1), each consumption power in cases of the implementation by the analog portion and the digital portion is estimated. Based on the estimation, it is selected one of the analog portion and the digital portion that has a smaller consumption power. According to (2), although a desired characteristic can be selected by both of the analog portion and the digital portion, the digital portion is selected in the case where the digital portion is capable of implementing a more preferable characteristic. According to (3), a signal processing time for realizing the facility is estimated, and thus it is selected one of the analog portion and the digital portion that has shorter delay time. According to (4), if it is exemplified that a desired radio signal processing facility is realized by the digital portion and a desired process is performed after a reception signal is outputted from the analog portion once and inputted to the digital portion and then it is necessary to input the signal to the analog portion again, the analog portion processing is selected in order to prevent the signal from reciprocating between the digital portion and the analog portion.

The aforementioned operations are executed, and thus it is able to implement an optimum configuration of the radio.

Figure 11:
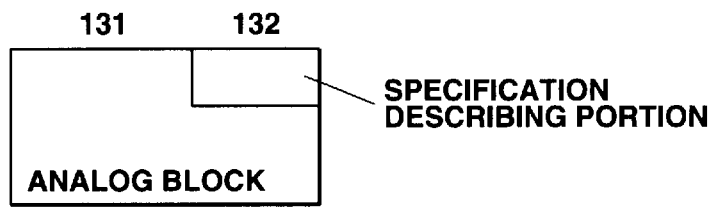
FIG. 11 is an illustrative view showing an analog facility block (analog block) adopted in a third embodiment of the present invention.

FIG. 11 is an illustrative view showing an analog facility block (analog block) adopted in a third embodiment according to the present invention. According to this embodiment, the configurations of a digital facility block and software are similar to those of FIG. 2 except for the configuration of the analog block, so that the similar configuration is omitted in the figure.

Referring to FIG. 11, an analog block 131 has a specification description portion 132. It is to be noted that all of the analog blocks in FIG. 2 may have the specification describing portion 132, similarly with the analog block 131, and only a part of the analog block may have the specification describing portion 132. Incidentally, as for the analog block, there are exemplified an amplifier, a mixer, a synthesizer, and the like, as stated above.

The specification of the analog block 131 is described to the specification describing portion 132. So long as the specification describing portion 132 could store a specification, the specification describing portion 132 may be configured of a non-volatile memory, etc., or a switch, etc. The access from an external side enables the specification of the analog block 131, which has been described to the specification describing portion 132, to be read out. For example, mainly, the CPU 9 can read out the characteristics of the individual analog blocks in FIG. 2.

Figure 12:
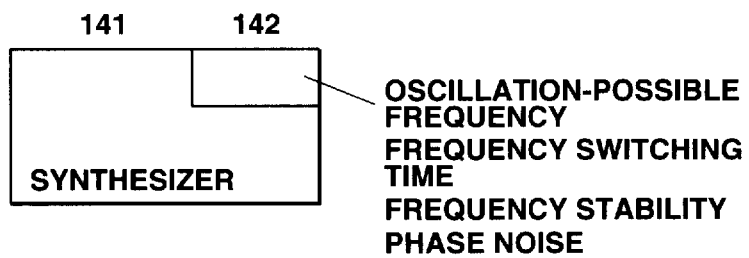
FIG. 12 is an illustrative view showing a case in which the analog block is, for example, a synthesizer 141 corresponding to a synthesizer 3 in FIG. 2.

FIG. 12 shows a case in which the analog block is, for instance, a synthesizer 141 which corresponds to the synthesizer 3 in FIG. 2. The specification regarding the synthesizer 141 is described to a specification describing portion 142. It is exemplified that the contents which are written to the specification describing portion 142 are an oscillation-possible frequency, a phase noise, a frequency switching time, frequency stability, etc. as follows.

| Oscillation-possible frequency | 1895.15 to 1917.95 MHz |
|---|---|
| Frequency switching time | 1 msec |
| Phase noise | −27 dB |
| Frequency stability | ±2.5 ppm |

Note that the specification of the specification describing portion 142 is described in accordance with a standard which has been defined in advance. For instance, a standard such as a temperature range is preset for the frequency stability, and a standard such as an integral range of the phase noise is preset therefor, thereby describing the specification in accordance with those standards.

Figure 13:
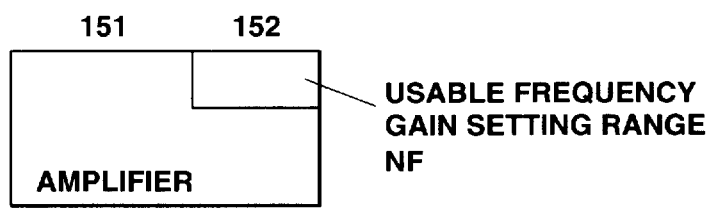
FIG. 13 is an illustrative view showing a case in which the analog block is an amplifier 151 corresponding to an amplifier 1 in FIG. 2.

FIG. 13 shows a case where the analog block is an amplifier 151 which corresponds to the amplifier 1 in FIG. 2. The specifications regarding the amplifier 151 such as a usable frequency, gain variable range, and an NF are written to the specification describing portion 152 as follows.

| Usable frequency | 1.5 to 2 GHZ |
|---|---|
| Gain variable range | 0 to 40 dB |
| NF | 2.0 dB |

The library side can read the information via the device drivers and the basic software such as the OS, and use the information as discrimination factors indicative of whether necessary performance is obtained or not, and the like. For instance, the information enables the discrimination about whether necessary characteristics as the whole radio are obtained or not in a software manner on specific hardware from the library side.

The analog portion is constructed by not separating the synthesizer, amplifier, mixer, etc. in a hardware manner and formed on a single chip. In such a case, the IC may be provided therein with a specification describing portion to which the information regarding some facility blocks formed on a single chip is described in a lump, alternatively, with a plurality of specification describing portions to which the information is distributed and described, which can be read from the CPU side.

Figure 14:
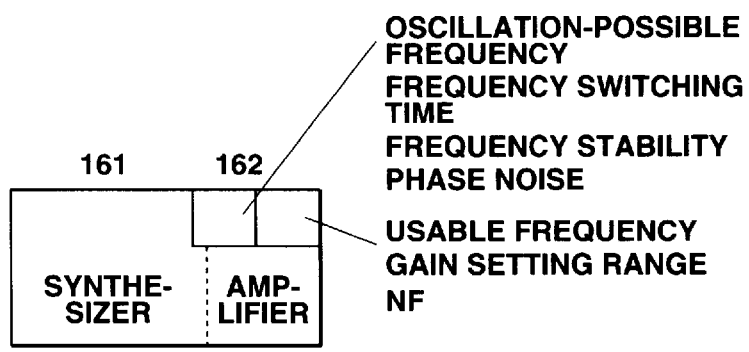
FIG. 14 is an illustrative view showing an example of an IC in which a synthesizer and an amplifier are constructed on one chip.

FIG. 14 shows an example of an IC to which a synthesizer and an amplifier are formed on a single chip. An analog block 161 corresponds to the amplifier 1 and synthesizer 3 in FIG. 2. Each of the specifications relating an amplifier unit and a synthesizer unit of the analog block 161 is described to a specification describing portion 162. It is capable of reading out the information from the CPU side, respectively.

Next, a method of describing the information will be now described. It is exemplified that there is a method whereby a memory such as an ROM is formed on the analog block in advance and the information is written in the memory. In this example, a data terminal and an address terminal are provided in order to derive information in the ROM, an address is designated from the CPU, and to thereby enable characteristics of the analog block to be outputted in format of digital data from the data terminal.

Figure 15:
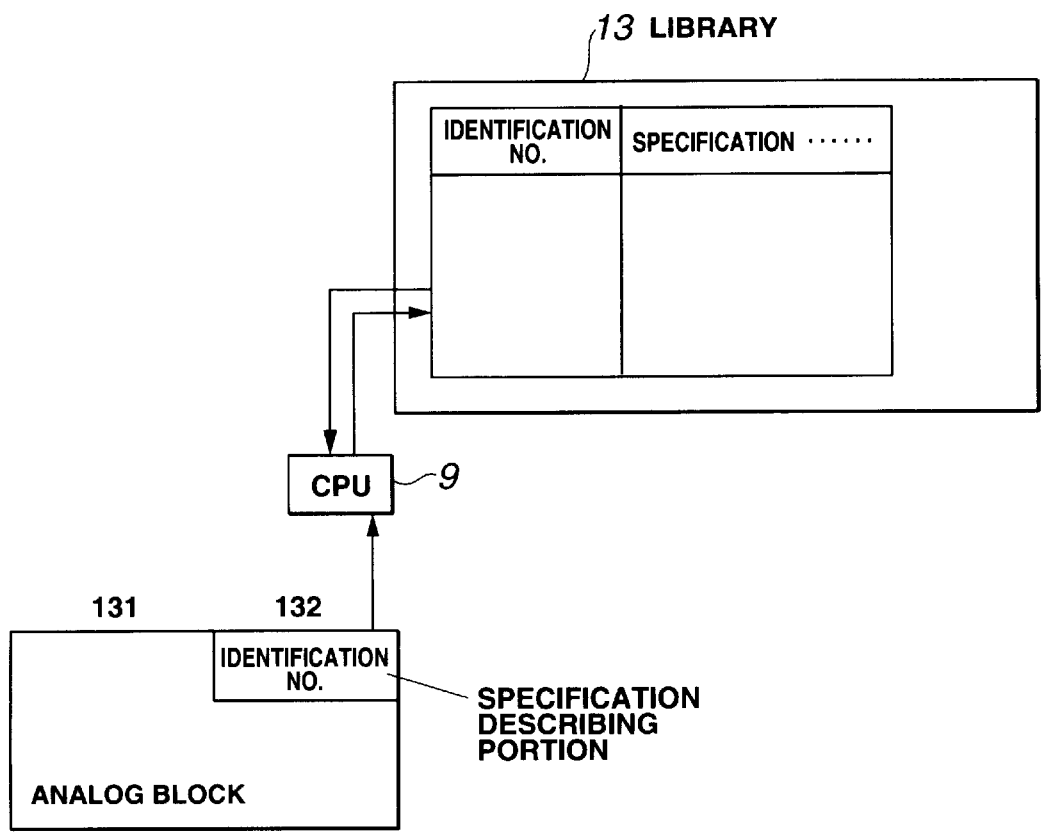
FIG. 15 is an illustrative view showing an analog facility block (analog block) which is adopted in a fourth embodiment of the present invention.

FIG. 15 is an illustrative view showing an analog facility block (analog block) which is adopted in a fourth embodiment of the present invention. As for the configuration of the specification describing portion, this embodiment is different from the third embodiment of FIG. 11.

That is, the specification itself is not described to the specification describing portion, but an identification number of the analog block is described. By preparing a cross-reference table of the identification number and the specification of the analog block in the library beforehand, the CPU can obtain information regarding characteristics of the analog block.

Referring to FIG. 15, an identification number of the analog block 131 is described to the specification describing portion 132 assured in the analog block 131. The CPU 9 reads the identification number from the specification describing portion 132 of the analog block 131. Based on the identification number, by referring to a cross-reference table of the identification number described to the library 13 and the specification, necessary information can be obtained from the library.

Although the above-demonstrated configuration makes the procedure to obtain information more complicated, as compared with the configuration shown in FIG. 11, this enables remarkable decrease in quantity of information which is described in the analog block, and means a more preferable method. In the case where the specification is directly described to the specification describing portion, assuming that with respect to the information quantity thereof, for example, 5 bytes are necessary for specification item and 20 bytes are necessary for contents description of each specification, and then the total information quantity is equal to 100 bytes. By contrast, if using only the identification number, for example, about 4 bytes are necessary, and this value indicates that the information quantity can be suppressed to an information size of ⅕. Even if 4 bytes are stored as an identification number, this is sufficient since it is able to identify the data kinds of 32 bits (two to the 32nd power).

Figure 16:
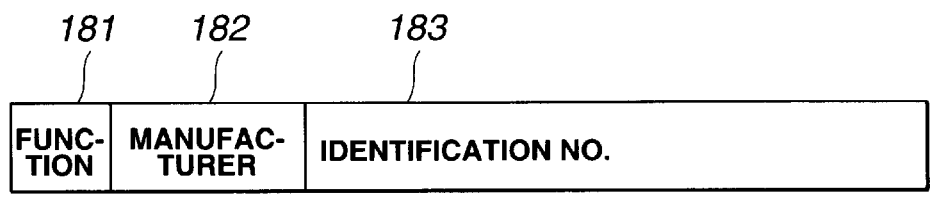
FIG. 16 is an illustrative view of a method of giving an identification number.

The following method of giving an identification number is considered as shown in FIG. 16. In other words, it is assumed that a first block is assigned to a facility 181 (such as a synthesizer, mixer, and amplifier); a subsequent block a manufacturer name 182; and a final block an identification number 183. The facility is expressed by, for example, the binary as four bits as follows.
0000 Mixer
0001 Amplifier for reception
0010 Synthesizer
0011 Amplifier for transmission
0100 Attenuator
.... ......

The following four bits indicate manufacturers.
0000 Manufacturer A
0001 Manufacturer B
0010 Manufacturer C
0011 Manufacturer D
0100 Manufacturer E
.... ......

Note that the foregoing is one example, it is not necessarily necessary to require four bits for the bit number to express, for instance, the facility, and the part showing the manufacturer is similar thereto. The bit number may be taken into account and decided as the necessity may arise.

Although the case of the analog portion has been explained, it will be obviously understood that it is effective to provide a similar specification describing portion to the digital portion which has a dedicated facility and can change the characteristics by the setting from the external side, in other words, even an IC such as a digital filter for supplying tap coefficients as parameters, serving as one digital filter type, and a digital orthogonal demodulator for supplying an oscillation frequency of a local oscillator as a parameter, as well as the analog portion. For instance, the following specifications may be described to the digital filter.

| | |
|---|---|
| Maximum tap number | 256 |
| Precision of tap coefficient | 16 bits |
| Maximum processing speed | 50M samples/sec |

The internal side of the digital portion is configured of digital circuits, so that the configuration to digitally output the specification to the external side makes the manufacture thereof, particularly more simple, as compared with that of the foregoing analog block. This is preferable to the method according to this embodiment.

In this invention, it is apparent that working modes different in a wide range can be formed on this basis of this invention without departing from the spirit and scope of the invention. This invention is not restricted by any specific embodiment except being limited by the appended claims.

What is claimed is:

1. A radio communicating apparatus comprising:
   a receiving and transmitting device configured to receive and transmit a radio signal;
   an A/D converter configured to convert said radio signal which has been received into an incoming digital signal and output the incoming digital signal;
   a D/A converter configured to convert an outgoing digital signal into said radio signal and output the radio signal;
   a digital signal processing device configured to perform digital signal processing for an output of said A/D converter and for an input of said D/A converter;
   a first memory device configured to store a first library comprising a group of software to implement a predetermined radio facility;
   a second memory device configured to store a predetermined source file and a predetermined compiler; and
   a controller configured to control at least one of said receiving and transmitting device, said A/D converter, said D/A converter, and said digital signal processing device by referring to said first library and a second library which exists in a device other than said radio communicating apparatus and which is different from said first library and to execute predetermined software on basic software,
   wherein said controller obtains said predetermined software by linking said first and second libraries when said predetermined source file is compiled using said predetermined compiler.

2. An apparatus according to claim 1, wherein
   said controller downloads an executable file obtained by compiling said predetermined source file while referring to said second library by a predetermined compiler, thereby obtaining said predetermined software by linking the executable file which is downloaded and said first library.

3. An apparatus according to claim 1, wherein said
   receiving and transmitting device comprises an analog device configured to perform an analog signal process and a digital device configured to perform a digital signal device,
   a specification storing portion for storing information regarding a specification is provided to at least one of said analog device and said digital device, and
   said controller reads said information regarding the specification and executes said control operation on the basis of the read information.

4. A radio communicating apparatus comprising:
   a receiving and transmitting device configured to receive and transmit a radio signal;
   an A/D converter configured to convert said radio signal which has been received into an incoming digital signal and output the incoming digital signal;
   a D/A converter configured to convert an outgoing digital signal into said radio signal and output the radio signal;
   a digital signal processing device configured to perform digital signal processing for an output of said A/D converter and for an input of said D/A converter;
   a first memory device configured to store a first library including a group of software to implement a predetermined radio facility;
   a controller configured to control at least one of said receiving and transmitting device, said A/D converter, said D/A converter, and said digital signal processing device by referring to said first library and a second library which exists in a device other than said radio communicating apparatus and which is different from said first library and to execute predetermined software on basic software,
   wherein said controller downloads an executable file obtained by compiling a predetermined source file while referring to said second library by a predetermined compiler, thereby obtaining said predetermined software by linking the executable file which is downloaded and said first library.

5. An apparatus according to claim 4, further comprising a second memory device configured to store said predetermined source file and said predetermined compiler,
   wherein said controller obtains said predetermined software by linking said first and second libraries when said predetermined source file is compiled using said predetermined compiler.

* * * * *